US007155428B1

United States Patent
Brown et al.

(10) Patent No.: US 7,155,428 B1
(45) Date of Patent: Dec. 26, 2006

(54) EMULATING A DATABASE SYSTEM

(75) Inventors: Douglas P. Brown, San Diego, CA (US); Mark W. Sirek, San Diego, CA (US); Jeetendra Chaware, Andhra Pradesh (IN)

(73) Assignee: NCR Corp., Dayton, OH (US)

( * ) Notice: Subject to any disclaimer, the term of this patent is extended or adjusted under 35 U.S.C. 154(b) by 317 days.

(21) Appl. No.: 10/039,283

(22) Filed: Dec. 31, 2001

Related U.S. Application Data

(63) Continuation-in-part of application No. 09/923,975, filed on Aug. 7, 2001, which is a continuation-in-part of application No. 09/608,977, filed on Jun. 30, 2000.

(51) Int. Cl.
*G06F 17/30* (2006.01)

(52) U.S. Cl. .............. 707/4; 707/2; 707/3; 707/10; 709/204; 715/700; 345/700

(58) Field of Classification Search .............. 707/2, 707/3, 10, 104.1, 4, 100, 102, 1.5; 345/700, 345/501; 715/700; 709/204; 712/30, 43
See application file for complete search history.

(56) References Cited

U.S. PATENT DOCUMENTS

| | | | | |
|---|---|---|---|---|
| 5,303,383 | A | | 4/1994 | Neches et al. ............ 712/43 |
| 5,488,570 | A | * | 1/1996 | Agarwal ............... 345/501 |
| 5,508,942 | A | * | 4/1996 | Agarwal ............... 709/204 |
| 5,511,003 | A | * | 4/1996 | Agarwal ............... 709/204 |
| 5,515,296 | A | * | 5/1996 | Agarwal ............... 709/204 |
| 5,640,584 | A | | 6/1997 | Kandasamy et al. ........ 712/30 |
| 5,857,192 | A | * | 1/1999 | Fitting ................. 707/10 |
| 5,864,841 | A | * | 1/1999 | Agrawal et al. .......... 707/2 |
| 5,864,842 | A | | 1/1999 | Pederson et al. .......... 707/3 |
| 5,884,299 | A | | 3/1999 | Ramesh et al. ........... 707/2 |
| 6,067,542 | A | * | 5/2000 | Carino, Jr. .............. 707/4 |
| 6,370,522 | B1 | * | 4/2002 | Agarwal et al. .......... 707/2 |
| 6,401,083 | B1 | * | 6/2002 | Agarwal et al. .......... 707/2 |
| 6,430,556 | B1 | * | 8/2002 | Goldberg et al. ......... 707/4 |
| 6,487,547 | B1 | * | 11/2002 | Ellison et al. ........... 707/2 |
| 2003/0016237 | A1 | * | 1/2003 | Hickey ................. 715/700 |

OTHER PUBLICATIONS

Oracle Corporation, "SQL Language: Reference Manual, Version 6.0," pp. 5-1 to 5-5, 5-96 to 5-97 (1990).
Eugene Wong et al., ACM Transactions on Database Systems, vol. 1, No. 3, "Decomposition-A Strategy for Query Processing," pp. 223-241 (Sep. 1976).
P. Griffiths Selinger et al., ACM, "Access Path Selection in a Relational Database Management System," pp. 23-34 (1979).
Masaru Kitsuregawa et al., Institute of Industrial Science, University of Tokyo, "Ouery Execution for Large Relations on Functional Disk System," pp. 159-167 (1989).
U.S. Appl. No. 09/976,634, filed Oct. 12, 2001.
U.S. Appl. No. 09/976,632, filed Oct. 12, 2001.

(Continued)

*Primary Examiner*—Shahid Al Alam
(74) *Attorney, Agent, or Firm*—Trop, Pruner & Hu P.C.

(57) ABSTRACT

A method and apparatus provides for the extraction of environment information from a target database system. The environment information includes at least one of cost-related information and random sample statistics. The cost-related information and/or random sample statistics are imported to a test system, where the cost-related information and/or random sample statistics are used in query plan analysis by an optimizer.

2 Claims, 13 Drawing Sheets

OTHER PUBLICATIONS

U.S. Appl. No. 09/977,038, filed Oct. 12, 2001.
U.S. Appl. No. 09/608,977, filed Jun. 30, 2000.
D.D. Chamberlin et al., "Views, Authorization, and Locking in a Relational Data Base System," National Computer Conference, pp. 425-430 (1975).
D.D. Chamberlin et al., "Sequel 2: A Unified Approach to Data Definition, Manipulation, and Control," IBM Journal of Research and Development, vol. 20, pp. 560-575 (Nov. 1976).

M.W. Blasgen et al., "On The Evaluation of Queries in a Relational Data Base System," IBM Research Report RJ 1745, pp. 1-44 (Apr. 1976).

M.W. Blasgen et al., "Storage and Access in Relational Data Bases," IBM Systems Journal, No. 4, pp. 363-377 (1977).

* cited by examiner

US 7,155,428 B1

EMULATING A DATABASE SYSTEM

CROSS REFERENCE TO RELATED APPLICATIONS

This is a continuation-in-part of U.S. Ser. No. 09/923,975, filed Aug. 7, 2001, which is a continuation-in-part of U.S. Ser. No. 09/608,977, filed Jun. 30, 2000.

BACKGROUND

A database is a collection of stored data that is logically related and that is accessible by one or more users or applications. A popular type of database is the relational database management system (RDBMS), which includes relational tables made up of rows and columns. Improved database technologies have enabled the storage of relatively large amounts of data that can be efficiently accessed and manipulated. For example, in some data warehousing applications, the amount of data can be quite large (such as in the hundreds of gigabytes to multiples of terabytes of data). One example database system capable of storing such large amounts of data is the TERADATA® database system from NCR Corporation. A TERADATA® database system is a parallel database system that includes a large number of access modules (referred to as access module processors or AMPs) for managing concurrent access and manipulation of multiple portions of data stored in the database system.

In many database systems, much of the data management is controlled by software. For example, the access modules or AMPs referred to above in TERADATA® database systems, along with other database logic, are implemented as software executable on one or more nodes in the database system. As database management software becomes increasingly complex, the testing of database management software also becomes more difficult. In testing complex software that is executed in a complex system, the test environment (often at the site of the software developer) is usually quite different from the actual operating environment. The difference between the test environment and an actual production environment can lead to inaccurate testing of database management software.

One of the goals of a database management system is to optimize the performance of queries for access and manipulation of data stored in the database system. In many database systems, this optimization is performed by an optimizer. Given a query, the optimizer selects one of multiple query or access plans, typically the plan with the lowest cost. The number of alternative query plans for a given query grows exponentially with the number of tables participating in the query.

The performance of query plans depends upon the hardware and software environment of a target database system. Differences in database systems often cause the performance of query plans to differ significantly. One technique to emulate or simulate a target (customer) environment is by using expensive, custom hardware. However, such hardware-based test facilities are usually not cost effective.

SUMMARY

In general, an improved method and apparatus is provided for emulating a target database system for test purposes. For example, a method comprises importing environment information of a target database system into a test system, the environment information comprising random sample statistics. The random sample statistics are stored in a storage location, and the random sample statistics are used to perform query plan analysis for a given query.

Other or alternative features will become apparent from the following description, from the drawings, and from the claims.

DETAILED DESCRIPTION

Figure 1:
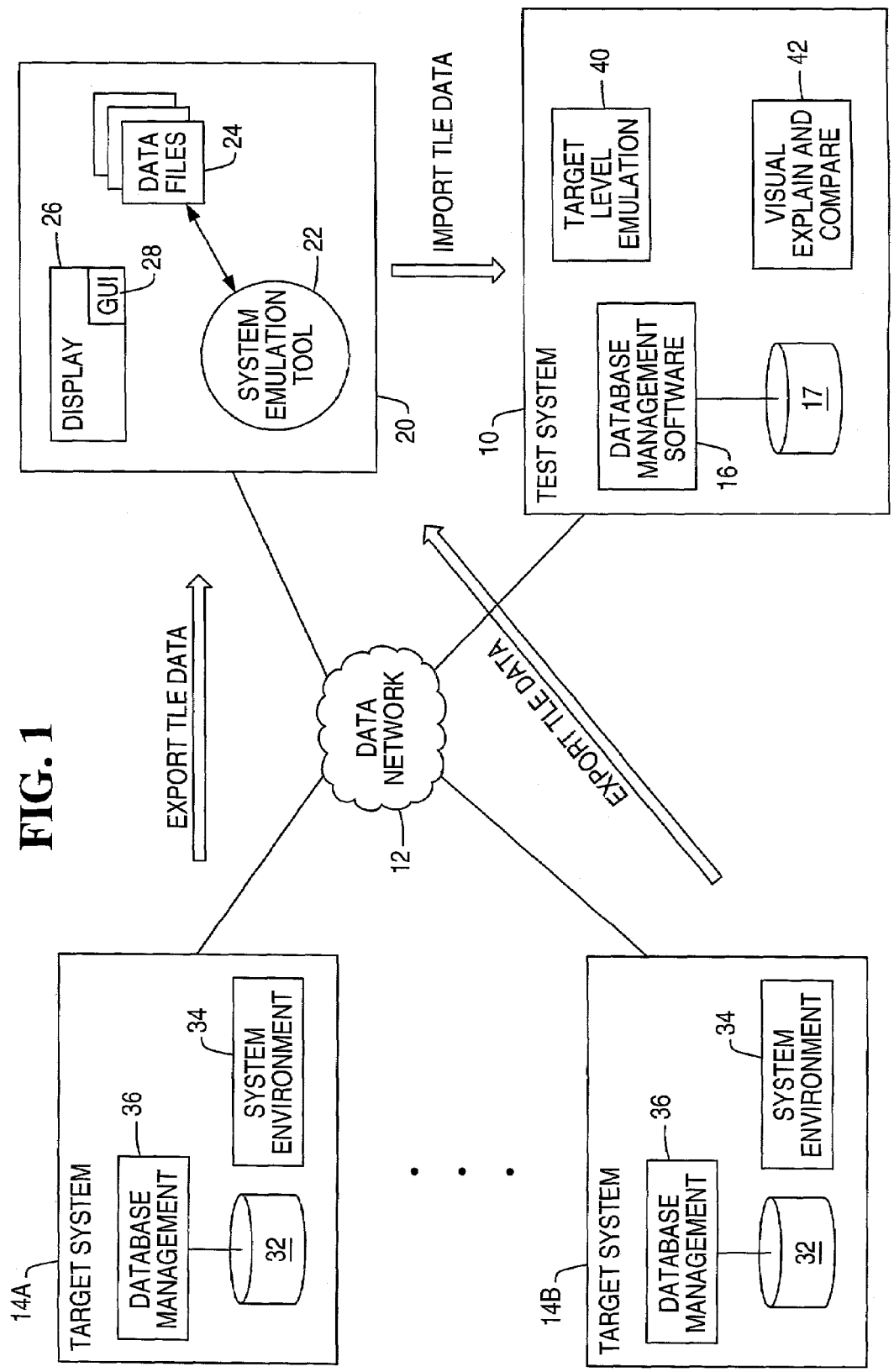
FIG. 1 is a block diagram of an example arrangement of an interconnected group of an emulation client system, a test or analysis system, and various target database systems.

In the following description, numerous details are set forth to provide an understanding of the present invention. However, it will be understood by those skilled in the art that the present invention may be practiced without these details and that numerous variations or modifications from the described embodiments are possible.

In accordance with some embodiments, a target-level emulation feature allows emulation of a target database system (also referred to as a customer database system or production database system) by capturing environment information from the target database system for purposes of query optimization and other analysis. The environment information of the target database system is extracted and communicated to a test system. The captured target environment information is stored in and/or mapped to appropriate tables, files, and other storage locations in the test system. The test system includes an optimizer that executes to determine query plan performance within the captured target environment.

The captured environment information includes cost-related information and random samples of a target database system. Cost-related information includes the following types of information, in accordance with one example: number of nodes, number of central processing units (CPUs) per node, number of access modules per node, the amount of memory allocated per access module, MIPS (millions of instructions per second) for each CPU, disk access speeds, network access speeds, and other system-specific information. An access module is a software module that manages access of data stored in a respective portion of a database system's storage. An example of an access module is an access module processor (AMP) used in some TERADATA® database systems (from NCR Corporation).

Random samples include a sample of statistics that are captured from a segment (less than all) of the data stored in the target database system. Faster retrieval of statistics is made possible by collecting the samples from only a segment of the data. Thus, for example, in a database system having N (N>1) access modules, the random samples are collected from M (M<N) access modules. The M access modules from which the random samples are collected are selected at random. In one embodiment, random selection of one or more access modules is performed by use of a pseudo-random number generator (implemented in software or hardware).

Examples of information contained in a random sample include the number of rows of a table, number of indexes defined on the table, the minimum row length, maximum row length, and other information (described further below). As used here, the terms "random samples," random statistics," "sample statistics," and "random sample statistics" are used interchangeably.

In emulating an environment of a large database system for query optimization purposes, the ability to capture random samples is useful for optimizers to accurately determine performance of query plans. During normal operation, statistics are collected and stored by the database system. The statistics are accessed by the optimizer when selecting a query plan for a given query. However, such statistics may not be easily captured for loading into a test system that is separate from the production database system. For a large target database system, capturing statistics of all tables (which can number in the thousands to tens of thousands) is often a time-consuming process, sometimes taking hours or days. Without the availability of accurate statistics of tables of the target database system, execution of the optimizer in the test environment likely will not produce accurate results. Random samples can be captured in a substantially more time-efficient manner, with statistics generated based on the random samples for use by the optimizer in the test environment.

The capture of cost-related information enables cost-based target level emulation, while the capture of random samples enables random sample-based target level emulation. The two types of emulation are used together in a test system for a more precise analysis of query plans.

FIG. 1 shows an example arrangement having plural target database systems (14A, 14B), a test system 10, and an emulation client system 20 in which a system emulation tool 22 is executable. Note that the client emulation system 20 can be integrated with the test system 10 onto a signal platform in some embodiments.

In one example, the target database system 14A is located at a first customer site, while the target database system 14B is located at a second customer site. Each target database system 14 includes database management software 36 that manages access of data in a respective database 32. In accordance with some embodiments, the database 32 is distributed across plural access modules and corresponding storage modules in each target database system 14. For example, if the target database system 14 is a TERADATA® database system from NCR Corporation, then the access modules are AMPs. The target database system includes one node or plural nodes, with each node capable of executing one or plural access modules.

Each target database system 14 is associated with a system environment 34, which is made up of system-specific information as well as database-level information As used here, "environment information" of a target database system refers to the system-specific information, database-level information, or any portion of the system-specific or database-level information.

System-specific information essentially includes cost-related information, such as the number of nodes in the target system, the number of processors or CPUs per node, the number of virtual processors (e.g., AMPs) in each node, and other system information. Database-level information includes random samples, data manipulation language (DML) statements, data definition language (DDL) statements, and the actual data of the database itself.

The target database systems 14A, 14B are coupled to a data network 12. The data network 12 can be a private network (such as a local area network or wide area network) or a public network (such as the Internet). The emulation client system 20 is also coupled to the data network. Various data files 24 stored in the emulation client system 20 contain environment information, also referred to as target-level emulation (TLE) data exported from respective database systems 14A, 14B. The system emulation tool 22, executable in the emulation client system 20, is able to export TLE data from the target database systems 14A, 14B over the data network 12. The TLE data is then imported into the test system 10. If the client emulation system 20 is integrated with the test system 10, then the system emulation tool 22 and data files 24 are located on the same platform as the components of the test system 10. The environment information imported to the test system 10 is maintained as target-level emulation data 40.

Database management software 16 in the test system 10 includes an optimizer 18, which selects a query plan for a given query that accesses data in a database 17 managed by the database management software 16. The optimizer 18 executes in the target-level emulation data 40 imported into the test system 10 by the emulation client system 20. Running in the emulated target environment, the optimizer 18 identifies and selects the most efficient query plan (from among plural query plans) for a given query.

The test system 10 also optionally includes a visual explain and compare module 42 for displaying query plan(s) selected by the optimizer 18 in a user interface of the test system 10. Note that instead of executing in the test system 10, the visual explain and compare module 42 can alternatively execute in the emulation client system 20. In another embodiment, instead of using the visual explain and compare module 42, some other user interface is provided to present the results of query plan selection by the optimizer 18. If the visual explain and compare module 42 is used, a graphical user interface is provided, in which steps of the query plan are depicted as icons or other image elements, with icons connected by lines to represent the flow of the steps in the query plan. The icons that are displayed by the visual explain and compare module 42 are designed to represent database operations performed on data rows such as relational algebra operations (e.g., select, project, join); physical algebraic operators such as nested join, merge join, hash join, and so forth; data movement/organization operations such as sorts, redistribution, duplication; and database objects such as tables and views.

Another feature of the visual explain and compare module 42, in accordance with one embodiment, is the ability to graphically or visually compare plural query plans for a given query, with the plural query plans generated under different conditions. This provides the user with the ability to analyze differences between query plans.

In addition to more accurate performance of test queries by the optimizer 18, target-level emulation according to some embodiments also allows systems less sophisticated than the target database system to accurately emulate query plan generation. In fact, some test systems 10 are as simple as portable or notebook computers. Consequently, by using the target-level emulation feature in accordance with some embodiments, a more convenient, flexible, and cost-effective problem stimulation and troubleshooting method and apparatus is provided in test systems to more accurately test query plan generation.

Figure 2:
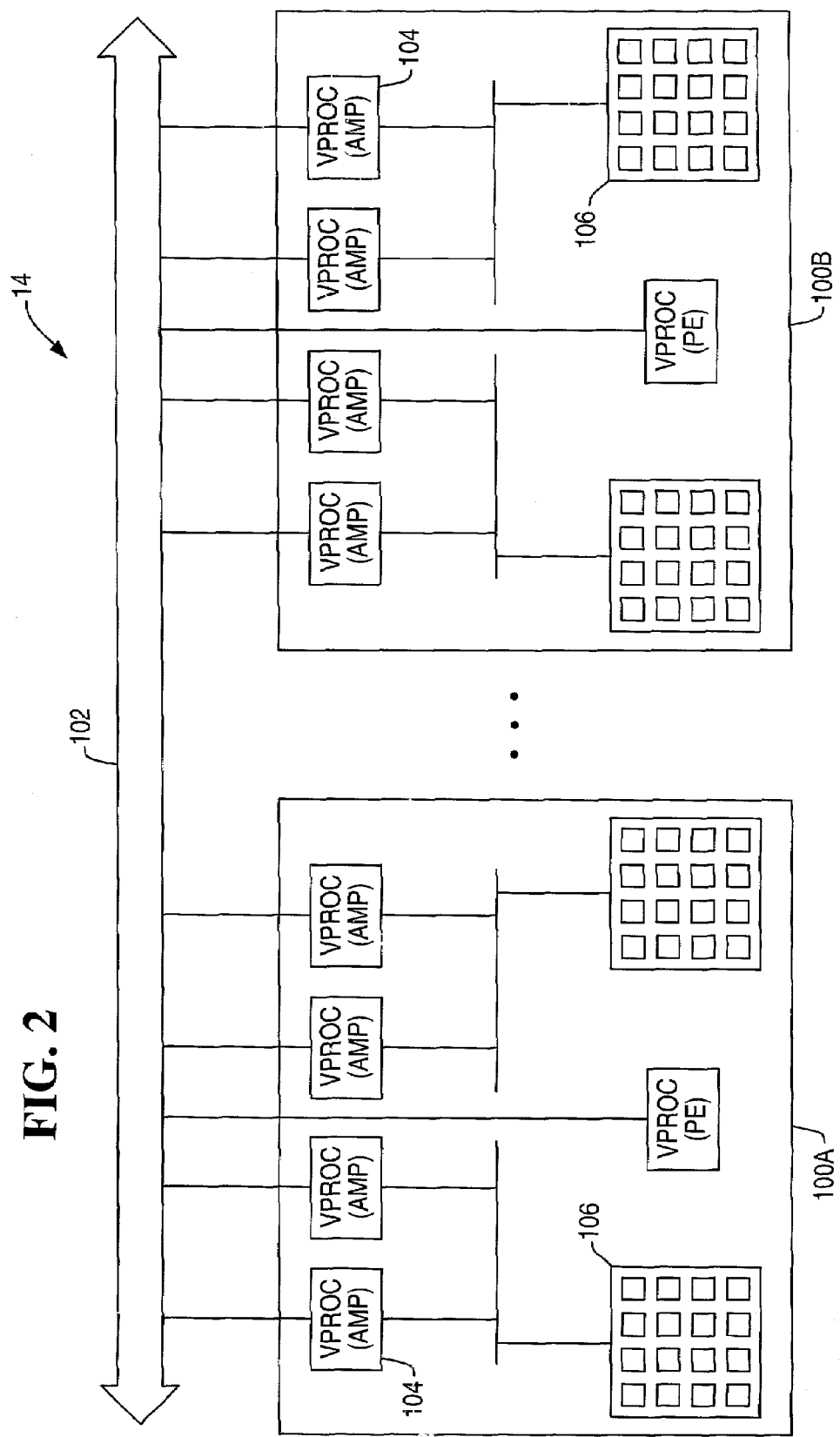
FIG. 2 is a block diagram of an example target database system.

FIG. 2 shows an example arrangement of a target multi-node parallel database system 14. The target database system 14 has plural nodes 100A, 100, and so forth, coupled by an interconnect network 102. Each node includes a single CPU or multiple CPUs.

Each node 100 also includes multiple virtual processors (VPROCs) 104, which include parsing engines (PEs) and access module processors (AMPs). A parsing engine receives a query, interprets the query, checks the query for proper syntax, and sends out executable actions to be performed by the AMPs with respect to data stored in storage modules 106. Queries submitted to a database system for data access and manipulation are according to a standard database query language, such as the Structured Query Language (SQL). One version of SQL is the SQL-92 Standard, while another version of SQL is the SQL-99 Standard (also referred to as the SQL-3 Standard).

Figure 3:
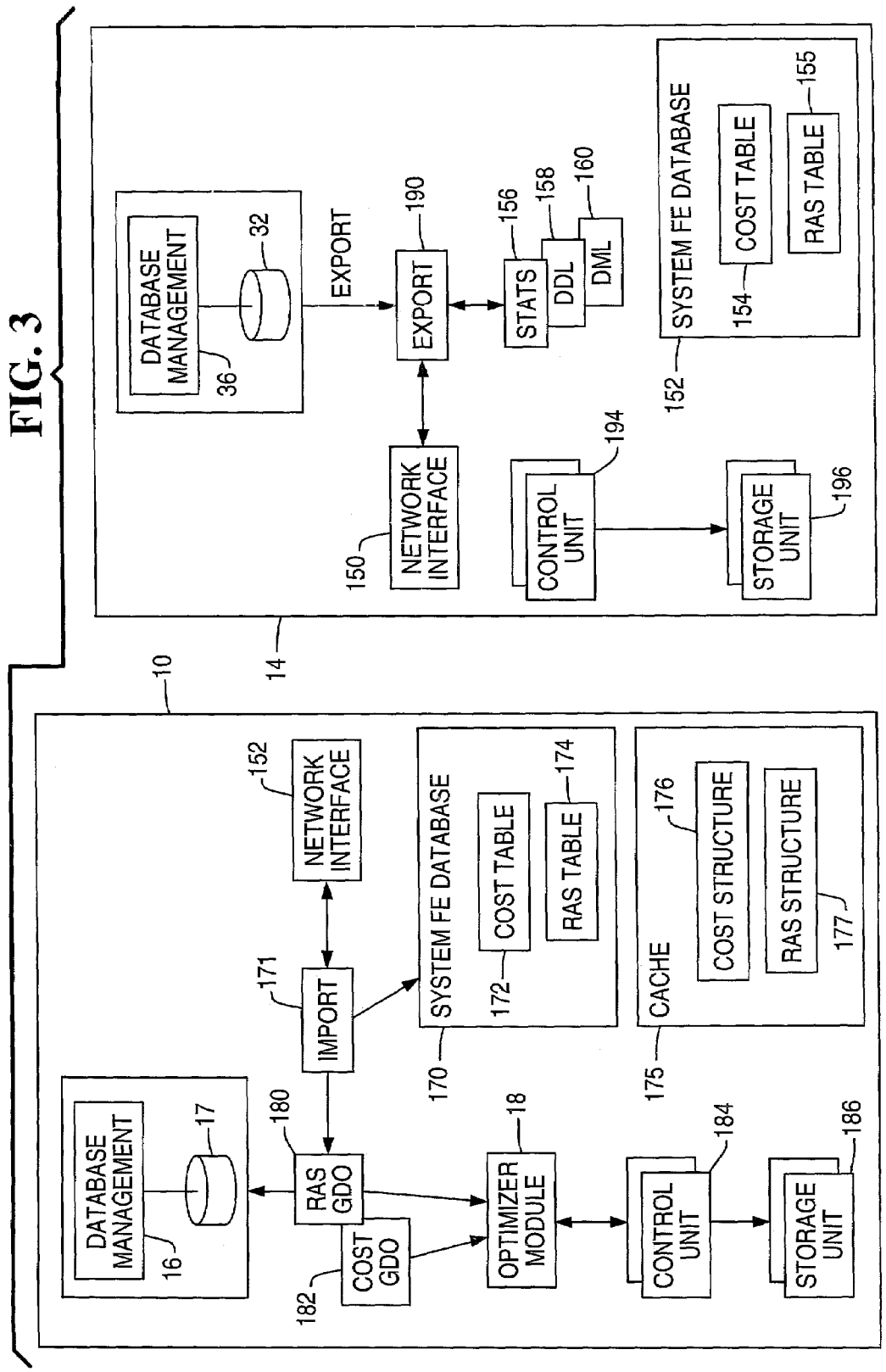
FIG. 3 is a block diagram of components of a test system and a target database system, in accordance with an embodiment.

FIG. 3 shows components of a target database system 14 and the test system 10 in greater detail. The target database system 14 contains database-level information, including statistics 156, DDL statements 158, DML statements 160, actual data 162 associated with the database 32, and other information. In addition, in accordance with an embodiment, cost-related information is stored in a cost table 154 in a system database 152, referred to as the SYSTEMFE database. Further, random samples are stored in a RAS (random AMP sample) table 155 in the SYSTEMFE table 152.

As described further below, SQL DIAGNOSTIC statements (or other queries or commands) are submitted to load the cost table 154 and RAS table 155. The various types of information are stored in one or more storage units 196 (e.g., non-persistent system memory or persistent storage such as magnetic media, optical media, and the like. Also, the database system 14 includes one or more control units 194 on which various software modules (e.g., database management software 36) are executable.

To export or extract target information, an export module 190 responds to requests from the system emulation tool 22 (FIG. 1) by retrieving the requested information. Desired statistics 156, DDL statements 158, DML statements 160, cost-related information, and random samples are extracted and communicated across the network 12 to the emulation client system 20.

The exported TLE data is communicated from the emulation client system 20 to the test system 10 in an import process. The TLE data is applied by an import module 171 to the appropriate data structures and storage locations in the test system 10. The imported TLE data is stored in one or more storage units 186 (e.g., non-persistent system memory and persistent storage).

The test system 10 also includes a SYSTEMFE database 170 that includes a cost table 172 for storing cost-related information and a RAS table 174 for storing random samples of the target database system 14. Note that the cost table 172 and RAS table 174 can store information for multiple target database systems in respective data rows.

Target level emulation can be performed at several levels, including at least a system level and session level for both cost-based and random sample-based target level emulation. A system has multiple sessions, with one session assigned to each user. If the emulation is selected to be at the session level, then data from the cost table 172 and RAS table 174 in the SYSTEMFE database 170 are inserted into a cost data cache structure 176 and RAS data cache structure 177, respectively. The data cache structures 176 and 177 are part of a cache 175, which can reside either in system memory of the test system 10 or on persistent storage. In either case, the content of the cache 175 is lost as a result of test system shutdown or restart. The cost data cache structure 176 and RAS data structure 177 contain cost-related information and random samples, respectively, that are valid only for a given session. Note that multiple ones of each of the cost and RAS data structures 176 and 177 can be maintained for multiple sessions.

If the target level emulation is performed at the system level, then the data in the cost table 172 and RAS table 174 are loaded into a cost global distributed object (GDO) 182 and RAS GDO 180, respectively. The GDOs are configuration files that remain valid across system restarts. Also, the system emulation information in the cost GDO 182 and RAS GDO 180 are distributed to plural entities in the test system 10 across multiple sessions. For example, the cost GDO and RAS GDO are distributed to multiple nodes so they are locally available in each node.

Target level emulation can also be performed at lower levels, including a request level and an IFP (interface processor) level. At the request level, the target level emulation information is valid only for a given request. At the IFP level, the target emulation information is valid only for a given parsing engine.

In one embodiment, SQL DIAGNOSTIC statements are used to extract cost-related information and random samples and to establish the cost-related information and random samples in corresponding data structures and files. The statements include a DIAGNOSTIC DUMP COSTS statement and DIAGNOSTIC SET COSTS statement. The DIAGNOSTIC DUMP COSTS statement, when issued to the target database system 14, dumps extracted cost-related information into rows of the cost table 154 in the target database system. The DIAGNOSTIC SET COSTS statement, when issued to the test system 10, sets up the cost-related information in the cost data cache structure 176 or cost GDO 182 and instructs the optimizer 18 in the test system 10 to use cost-related information of a specified target database system for a period defined by a keyword indicating the emulation level (e.g., system, session, request, IFP). Optionally, a DIAGNOSTIC HELP COSTS statement is provided to instruct the optimizer 18 to return certain predetermined values associated with the cost-based emulation.

Other SQL DIAGNOSTIC statements include a DIAGNOSTIC DUMP SAMPLES statement and DIAGNOSTIC SET SAMPLES statement. The DIAGNOSTIC DUMP SAMPLES statement, when issued to the target database system 14, causes random samples of a target database system to be loaded into the RAS table 155 in the target database system 14. The DIAGNOSTIC SET SAMPLES statement sets up the random samples in the RAS data cache structure 177 or RAS GDO 180 and instructs the optimizer 18 to use random samples of a target database system for emulation at a given level. Also, optionally, a DIAGNOSTIC HELP SAMPLES statement returns the random samples that have been set for each given level.

In one embodiment, the DIAGNOSTIC statements discussed above are extensions to the ISO/ANSI SQL-99 Standard. The DIAGNOSTIC statements can be issued by a user from the system emulation tool 22 (FIG. 1), or from any other user interface operatively coupled to the target database system 14 or test system 10.

The syntax of the various DIAGNOSTIC statements discussed above, in accordance with one embodiment, is described below. The DIAGNOSTIC DUMP SAMPLES statement has the following syntax:

DIAGNOSTIC DUMP SAMPLES target_system_name TABLE database_name.table_name;

The parameter target_system_name refers to the name of the target database system from which random samples are to be extracted. The parameter table_name is the name of the table for which random sample data is to be extracted or exported. The parameter database_name is the name of the database in which the table, table_name, is defined. The primary key for a sample row in the RAS table 155 or 174 is target_system_name+database_name+table_name. In other words, given the combination above, a row in the RAS table 155 or 174 is selected.

The DIAGNOSTIC SET SAMPLES statement has the following syntax:

DIAGNOSTIC SET SAMPLES target_system_name [NOT] ON FOR [SESSION, SYSTEM] TABLE database_name.table_name;

The parameter target_system_name is the name of the target database system to be emulated. The parameter NOT disables sample selection. The SESSION keyword and the SYSTEM keyword indicate the level at which emulation is to be performed. If SESSION is selected, then the sample values for the target database system are in effect for the duration of the current session until one of the following events occur: the user logs off the session, the database system is restarted, and the samples are changed. If the SYSTEM level is selected, then the sample values for the target database system are in effect for all sessions across all restarts until explicitly turned off, such as with the following statement:

DIAGNOSTIC SET SAMPLES target_system_name NOT ON FOR SYSTEM TABLE table_name.

The DIAGNOSTIC DUMP COSTS statement has the following syntax:

DIAGNOSTIC DUMP COSTS target_system_name;

The parameter target_system_name designates the target database system from which the optimizer cost-related information is to be extracted.

The DIAGNOSTIC SET COSTS statement has the following syntax:

DIAGNOSTIC SET COSTS target_system_name ON FOR [REQUEST, SESSION, IFP, SYSTEM];

Four different emulation levels can be specified, including REQUEST, SESSION, IFP, and SYSTEM. For the REQUEST level, the cost values for the target database system are in effect only for a current multi-statement request. For the SESSION level, cost values for the target database system are in effect for the duration of the current session until one of the following events occur: the user logs off the session, the database is restarted, the costs are changed by performing another DIAGNOSTIC SET COSTS statement; and a statement DIAGNOSTIC SET COSTS NOT ON FOR SESSION statement is issued.

At the IFP level, the cost values for the target database system are in effect on a current parsing engine for all sessions until one of the following events occur: the database is restarted; the costs are changed to a different target for IFP level; and the costs are reset to the same values as those for system level by performing a DIAGNOSTIC SET COSTS NOT ON FOR IFP statement. At the SYSTEM level, the cost values for the target database system are in effect for all sessions across all restarts until one of the following events occur: the costs are changed to a different target; and issuance of a DIAGNOSTIC SET COSTS NOT ON FOR SYSTEM statement.

Figure 4:
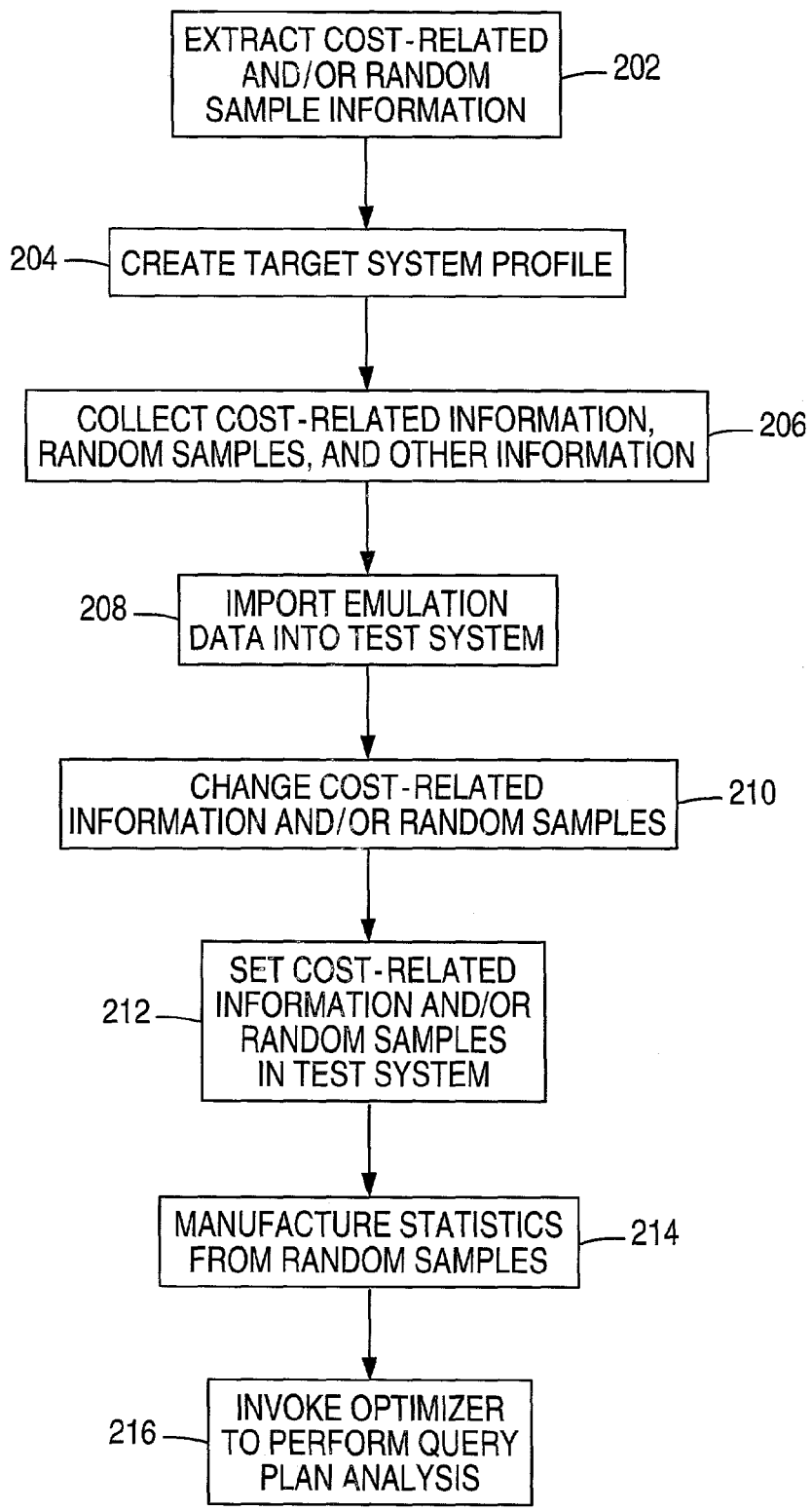
FIG. 4 is a flow diagram of a process of setting up an emulated database system environment and performing query optimization in the emulated environment.

FIG. 4 shows a process of performing target level emulation, in accordance with an embodiment. Depending on user requirements, one or both of extracting cost-related information and extracting random samples from a target database system 14 can be performed (at 202). To extract cost-related information, the DIAGNOSTIC DUMP COSTS statement is run in the target database system 14. The statement extracts cost-related information from the target database system into the cost table 154 (FIG. 3). Also, a DIAGNOSTIC DUMP SAMPLES statement can be issued to the target database system 14 to populate the RAS table 155, which extracts random sample statistics from the header of a specified table on the target database system into the RAS table 155.

According to one embodiment, random sample statistics are stored in a predefined header of each table in the target database system. Note that the random sample statistics can be stored elsewhere in the target database system in other embodiments. Also, to reduce the amount of information that is transported from the target database system 14 to the test system 10, the random sample statistics are based on a segment of each table (with the segment being less than the entire table). For example, if the target database system has N (N>1) access modules, then the random sample statistics are extracted from the segment of the table managed by less than N (e.g., one) access modules.

Next, using the test emulation tool 22 (FIG. 1), a target system profile is created (at 204) to define databases, tables, views, macros, cost parameters and/or random sample statistics to be captured for loading onto the test system 10. The optimizer cost-related information and/or random sample statistics and any necessary object definitions and test queries from the target database system 14 are collected (at 206) and placed in a staging area (e.g., data files 24 in the client emulation system 20 or a storage location in the target database system 14) for subsequent import into the test system 10. To do this, the export feature is invoked in the target emulation tool 22, which causes data created by the DIAGNOSTIC DUMP COSTS and/or DIAGNOSTIC DUMP SAMPLES statements to be written into the staging area.

Next, the system emulation tool 22, in response to invocation of its import feature, imports (at 208) the data from the staging area (data files 24 in the client emulation system 20 or storage location in the target database system 14) to the cost table 172 and/or RAS table 174 in the test system 10.

Using the system emulation tool 22, the user can change the captured cost-related information and random sample statistics if desired (at 210). Next, one or both of the following are performed (at 212): the DIAGNOSTIC SET COSTS statement is run to specify the cost-related information to use for emulation in the test system 10; and the DIAGNOSTIC SET SAMPLES statement is run to specify the random sample statistics to be used by the optimizer 18.

A data structure defined for the random sample statistics includes the following elements: SystemName (to indicate the name of the target database system); DBName (to indicate the name of the database to emulated); TableName (to indicate the name of the table to be emulated); NumRows (to indicate the number of rows in the table); NumIndex (to indicate the number of secondary indexes defined for the table); MinRowLen (to indicate the minimum row length in the table); MaxRowLen (to indicate the maximum row length in the table); Fields[SAMPMAXINDEXES] (to represent an array having plural elements each naming a secondary index, where s SAMPMAXINDEXES represents a maximum number of secondary indexes that are allowed); Count[SAMPMAXINDEXES] (to represent the number of rows for each secondary index sub-table); and RowSize

[SAMPMAXINDEXES] (to represent the average size of a row for each secondary index sub-table).

In some target database systems, a primary index and one or more optional secondary indexes are defined for each table. In a database system having multiple access modules, such as AMPs in TERADATA® database management systems, the primary index is used for assigning a data row to a particular one of the plural access modules. In effect, the primary index determines the distribution of rows of a table across multiple access modules of the database system. A secondary index is stored in a sub-table of the database system. The secondary index does not affect distribution of a table across multiple access modules. The secondary index stores data values and pointers to the rows in the base table where those data values occur. The secondary index can be arranged in ascending or descending order in the sub-table, so that the database management system can quickly search the index to find a particular value. The database management system can then follow the pointer to locate the row in the base table containing the value, which speeds up access of the base table.

The following is an example of a statement to create the RAS table 155 or 174 including the above data structure:

```
CREATE SET TABLE SYSTEMFE.OPT_RAS_TABLE
(
    SystemName ...,
    DBName ...,
    TableName ...,
    CreateTimeStamp ...,
    NumRows ...,
    NumIndexes ...,
    MinRowLen ...,
    MaxRowLen ...,
    Fields0 ...,
    Count0 ...,
    RowSize0 ...,
    Fields1 ...,
    Count1 ...,
    RowSize1 ...,
    - - -
    - - -
    - - -
);
```

The parameters Fields0, Count0, RowSize0 relate to a first secondary index, the parameters Fields1, Count1, RowSize1 relate to a second secondary index, and so forth.

The data structure for random sample statistics is also contained in the RAS data cache structure 177 and RAS GDO 180 when the test system 10 loads the respective cache structure or GDO file with the DIAGNOSTIC SET SAMPLES statement.

From the random samples set in the RAS data cache structure 177 or RAS GDO 180, the test system 10 "manufactures" (at 214) statistics for use by the optimizer 18. Note that the random samples are collected from less than all the access modules in the target database system 14. Certain values in the samples are extrapolated for a table stored by all the access modules. Thus, for example, if the random samples are collected from one access module in the target database system 14, which contains N access modules, then the value of NumRows is multiplied by N to estimate the total cardinality (number of rows) of the target table. The same is also applied to the value Countx (x=1, 2, ...) for a secondary index table associated with the target table. Thus, from the random samples, a "full set" of statistics can be manufactured for use by the optimizer 18.

The following is an example of a statement to create the cost table 154 or 172 (note that the fields listed are provided as examples only, as other fields may also be part of the cost table):

```
CREATE SET TABLE SYSTEMFE.Opt_Cost_Table
(
    SystemName
    SystemFamily
    TimeStamp1
    Version
    Comments
    OptAmpCnt
    AmpCnt
    IFPCnt
    OptSysCpuWeight
    OptSysDiskWeight
    OptSysNetWeight
    CPUscale
    OptRowAccessCost
    OptOutPutRowCost
    OptRedistributeCost
    OptSynonymCost
    OptRowIDCost
    OptCharFieldCost
    OptNumFieldCost
    OptOvhdOfRowCompCost
    OptTableBlockSize
    OptSpoolBlockSize
    OptIndexBlockSize
    OptDiskReadDelayTableScan
    OptDiskReadDelaySpoolScan
    OptDiskReadDelayIndexScan
    OptDiskWriteDelayTableScan
    OptDiskWriteDelaySpoolScan
    OptDiskWriteDelayIndexScan
    OptCpusperPMA
    OptVampsPerPMA
    OptVampsPerCPU
    OptPMAsPerDiskArray
    OptTotalPMAs
    ...,
    ...,
    ...,
    ...,
)
```

OptAmpCnt represents the number the optimizer uses for the number of AMPs in the system; AmpCnt is the actual number of AMPs in the system; IFPCnt represents the number of parsing engines; OptSysCpuWeight represents the system assigned weight to CPU contribution to the optimization of a query; OptSysDiskWeight represents the system assigned weight to disk contribution to the optimization of a query; OptSysNetWeight represents the system assigned weight to net contribution to the optimization of a query; CPUscale represents the units of milliseconds per instruction; OptRowAccessCost represents the cost of accessing a row in memory; OptOutPutRowCost represents the cost for building an output row; OptRedistributeCost represents the cost of redistributing a row; OptSynonymCost represents the cost of accessing a row by using an index; OptRowIDCost represents the cost of accessing a row through a row identifier (RowID) list; OptCharFieldCost represents the cost of building one character field; OptNumFieldCost represents the cost of building one numeric field; OptOvhdOfRowCompCost represents the cost of sort row comparison; OptTableBlockSize represents the maximum block size for tables; OptSpoolBlockSize represents the block size for spool files; OptIndexBlockSize represents the maximum block size for secondary index sub-tables; OptDiskReadDelayTableScan represents the disk read delay per block for a table; OptDiskReadDelaySpoolScan represents the disk read delay per block for a spool; OptDiskReadDelayIndexScan represents the disk read delay per block for an index scan; OptDiskWriteDelayTableScan represents the write delay per block for a table; OptDiskWriteDelaySpoolScan represents the write delay per block for a spool; OptDiskWriteDelayIndexScan represents the write delay per block for an index scan; OptCpusperPMA represents the number of CPUs in a processor module assembly (which in one embodiment is a node); OptVampsPerPMA represents the number of AMPs in a processor module assembly; OptVampsPerCPU represents the number of AMPs per CPU; OptPMAsPerDiskArray represents the number of processor module assemblies connected to a disk array; OptTotalPMAs represents the total number of processor module assemblies in the system; and so forth.

The data structure for the cost parameters is also contained in the cost data cache structure 176 and cost GDO 182 when the test system 10 loads the respective cache structure or GDO file with the DIAGNOSTIC SET COSTS statement. From the cost parameters set up in the cost GDO 182 or cost data cache structure 176, the configuration of the test system (which emulates the target database system) is set up.

Once the test system environment has been set up, the optimizer 18 is invoked (at 216) to perform query plan analysis in the emulated environment. The optimizer uses the emulated environment to generate an optimal query plan on the test system. The generated query plans are retrievable by the user (such as a user of the system emulation tool 22) for analysis and viewing.

Figure 5:
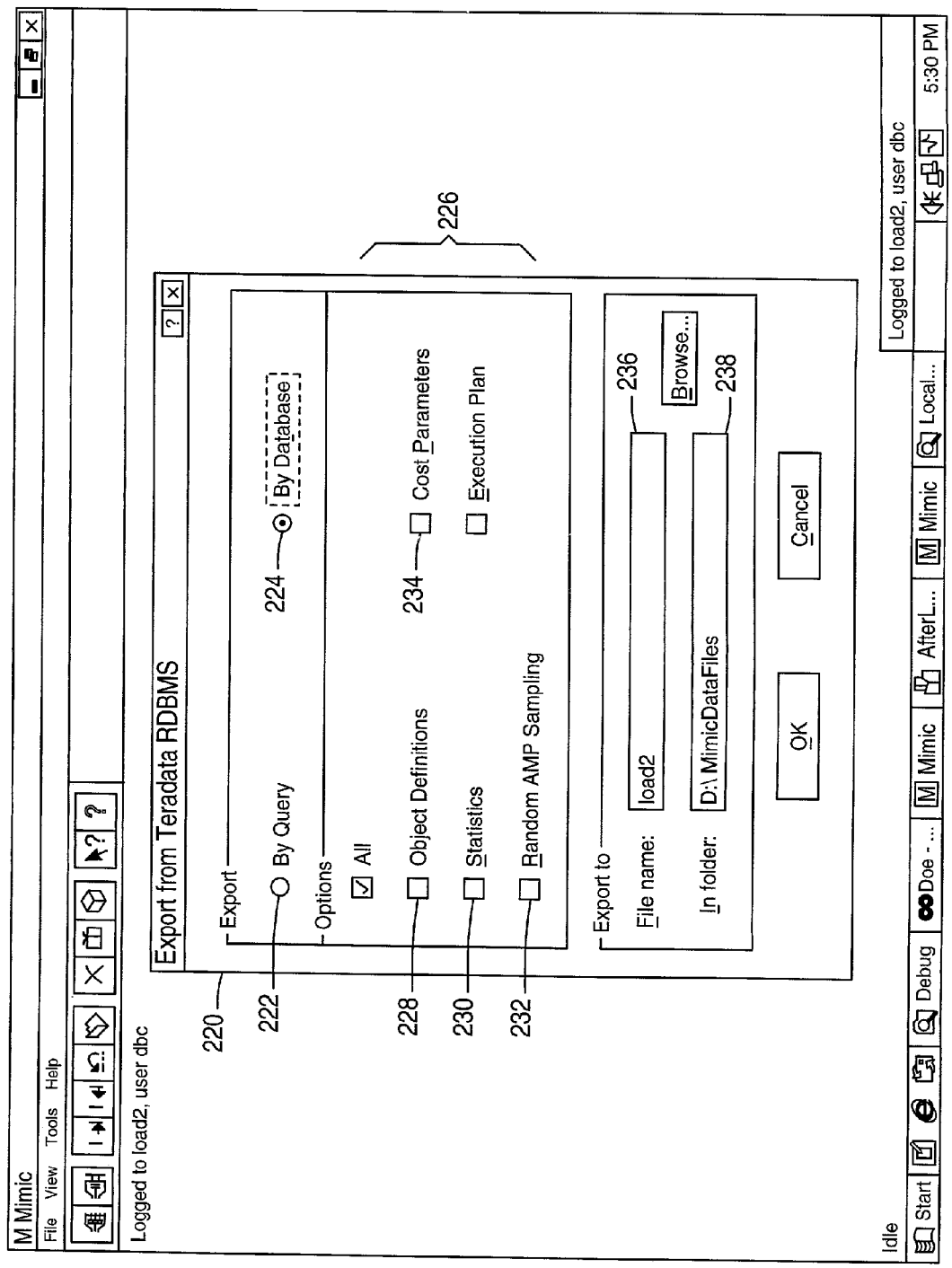
FIGS. 5–13 illustrate graphical user interface screens of a system emulation tool that is executable in the client emulation system of FIG. 1.

According to one example embodiment, several graphical user interface (GUI) screens provided by the system emulation tool 22 are illustrated. FIG. 5 shows a screen 220 that presents various options selectable by a user in exporting data from a target database system 14. The user can export TLE data either by a given query (by selecting a By Query element 222) or by database (by selecting a By Database element 224). Selection of the By Database element 224 causes environment information of all tables in a database to be exported. Selection of the By Query element 222 causes only environment information relating to tables referenced by the given query (or queries) to be exported.

The types of environment information to be exported are also selectable by a use in a selection box 226r. One option is to select all types of environment information. Alternatively, individual types of environment information can be selected, such as by selecting an Object Definitions option 228 (to capture object definitions information including DDL statements that define tables in the target database), a Statistics option 230 (to capture statistics data), a Random AMP Sampling option 232 (to capture random samples of AMPs), and a Cost Parameters option 234 (to capture cost-related information).

For each table in the target database, the object definitions information includes SQL CREATE statements (issued to create tables), SQL ALTER statements (issued to redefine or alter the table), other data definition language (DDL) statements, or other object definitions.

The file name into which the exported data is to be stored is specified in a field 236 in the screen 220 in FIG. 5, and a directory in which the file is located is specified in a field 238. Selection of the By Database element 224 causes an Export By Database screen 280 to be displayed (FIG. 7). Selection of the By Query element 222 causes an Export By Query screen 240 to be displayed (FIG. 6).

Figure 6:
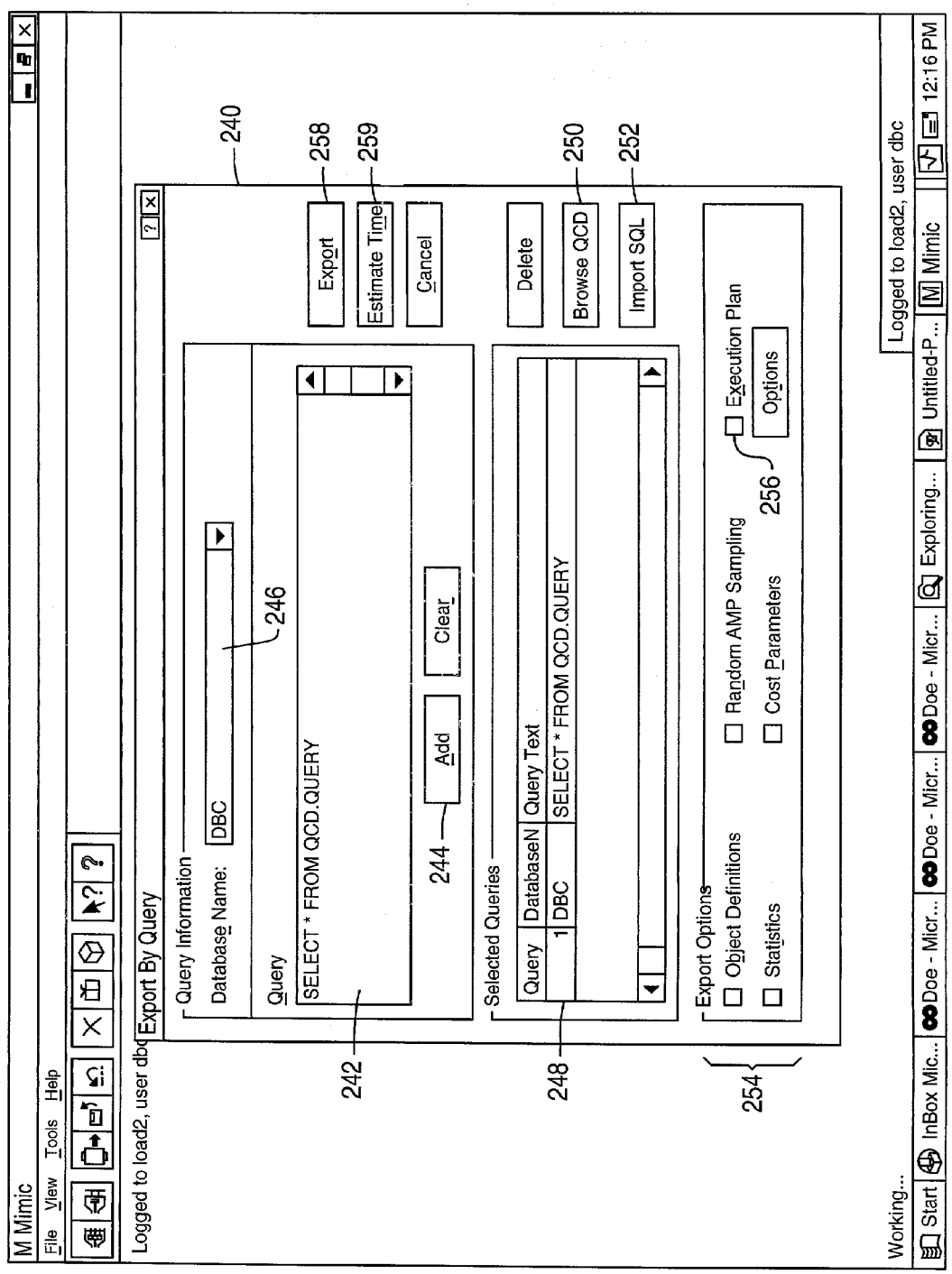
Figure 7:
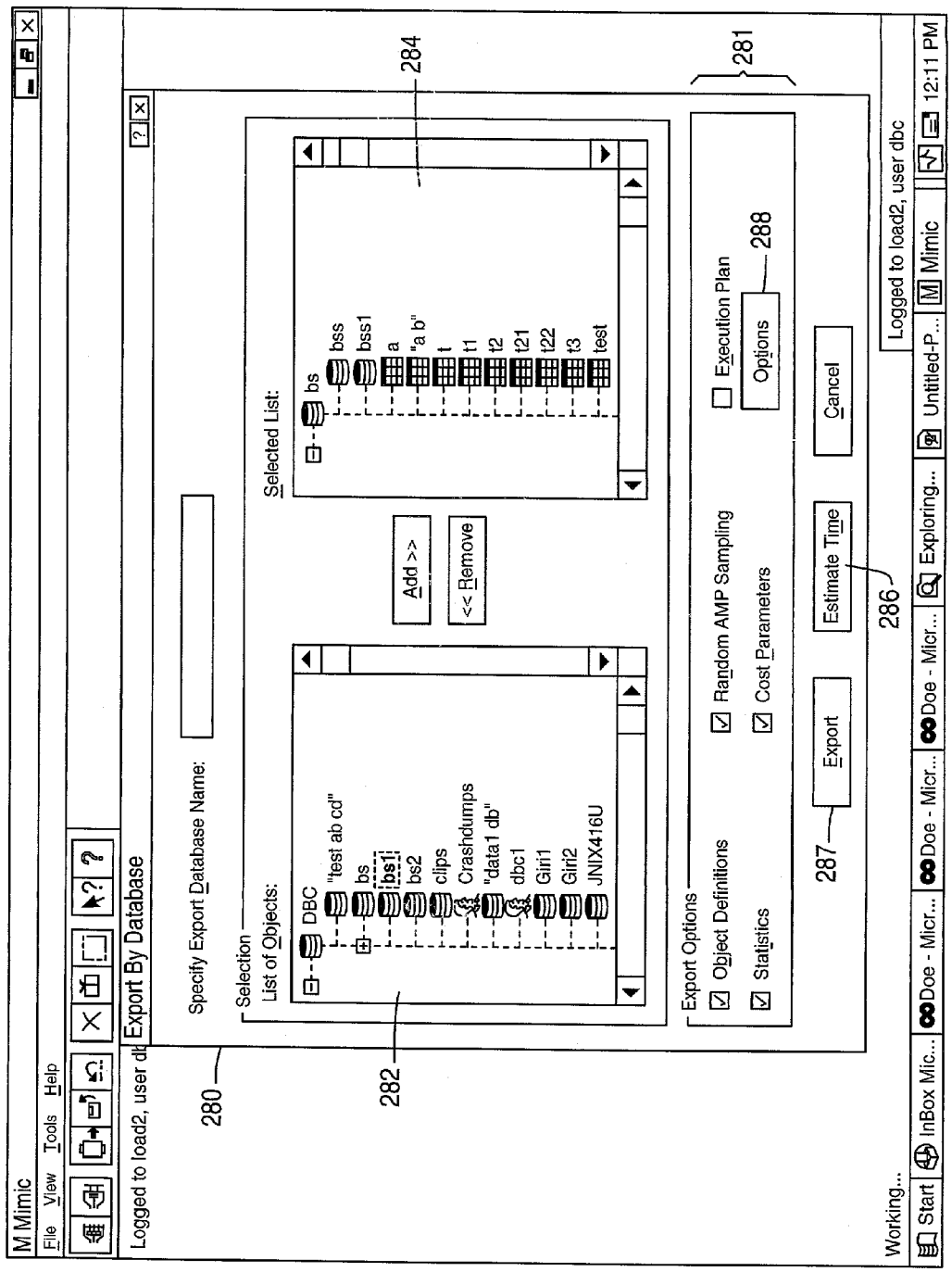

As shown in FIG. 6, the Export By Query screen 240 contains an entry box 242 in which the query text is entered by the user in the screen 240. Multiple queries can be entered into the box 242 by using an Add button 244. Also, the database name is provided in a Database Name field 246.

Selected queries are shown in a display box 248. The screen 240 also provides other mechanisms for entering queries. A Browse QCD button 250, when activated, allows queries from a query capture database (QCD) to be selected. The QCD contains a query list, which is basically a list of queries. Alternatively, by activating an Import SQL button 252, files containing SQL text can be selected to enter queries.

The Export By Query screen 240 also includes various user-selectable export options 254, which are similar to the export options 226 in FIG. 5. When selected, the Execution Plan option 256 causes execution plans (or query plans) associated with selected queries to be exported with the TLE data. According to one embodiment, the execution plan is a series of linear/parallel steps of statements and not generated code. The exported execution plans are generated by the optimizer in the target database system for each given query.

The Export By Query screen 240 also includes an Estimate Time button 259. When the Estimate Time button 259 is activated, a time value is displayed to indicate an estimated amount of time for the export operation. To export TLE data for the selected queries, the user activates an Export button 258.

FIG. 7 shows the Export By Database screen 280 that is displayed when the user selects the By Database element 224 in FIG. 5. In FIG. 7, the user can select one or more objects (tables or databases) for which TLE data is to be exported. A list of objects that can be selected is shown in a selection box 282, and the selected objects are shown in a display box 284.

The types of TLE data to be exported are selected by clicking on one or more of export options 281. In addition, the Export By Database screen 280 contains an Estimate Time button 286 that when selected causes a time value to be displayed to indicate how much time is needed for the export operation. An Export button 287 when activated causes the export operation to proceed. Further, an Options button 288 provides further export options that are selectable by a user.

If the Options button 288 is selected, then an Export Options screen 300 (shown in FIG. 8) is displayed. The Export Options screen 300 includes a user-selectable element 302 associated with exporting statistics data, user-selectable elements 304 associated with exporting random AMP samples (RAS) data, and user-selectable elements 306 associated with exporting cost parameters. A RAS Tag field 308 allows the entry of the name by which RAS data is stored in the target database system. A Cost Tag field 310 allows the entry of the name by which optimizer cost parameters are stored in the target database system.

Figure 9:
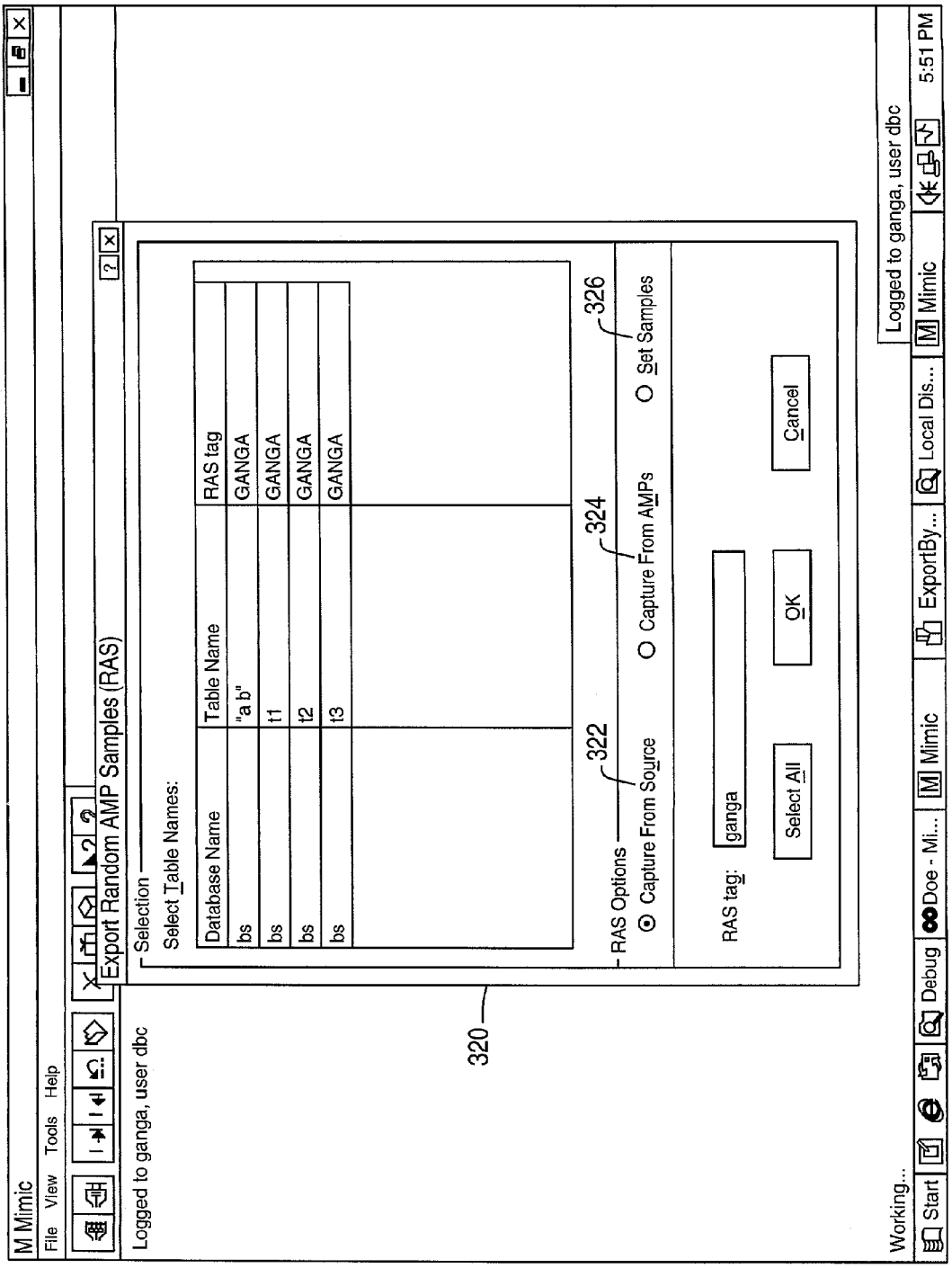

FIG. 9 shows an Export Random AMP samples (RAS) screen 320 that is displayed in response to activation of a Select Tables button 309 in the screen 300. The screen 320 lists tables that can be selected. RAS data is exported for the selected tables.

Three RAS options are selectable. A Capture From Source option 322 when selected causes random AMP samples to be exported from the RAS table 155 in the target database system. A Capture From AMPs option 324 when selected causes samples to be captured directly from the AMPs in the target database system, rather than from the RAS table 155. Another option, a Set Samples option 326, causes samples to be set (by the user) in the target database system, which are then exported.

Figure 8:
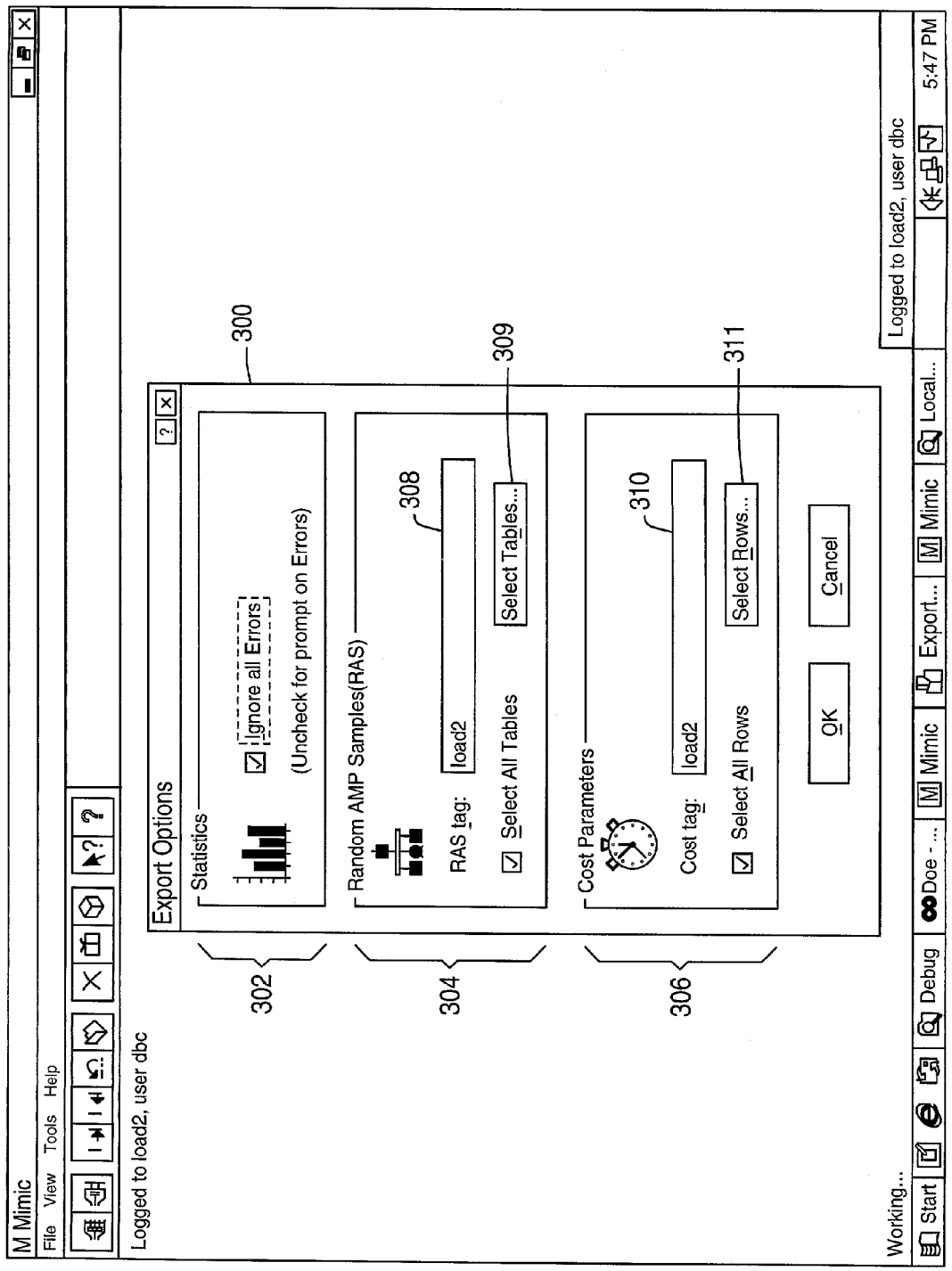
Figure 10:
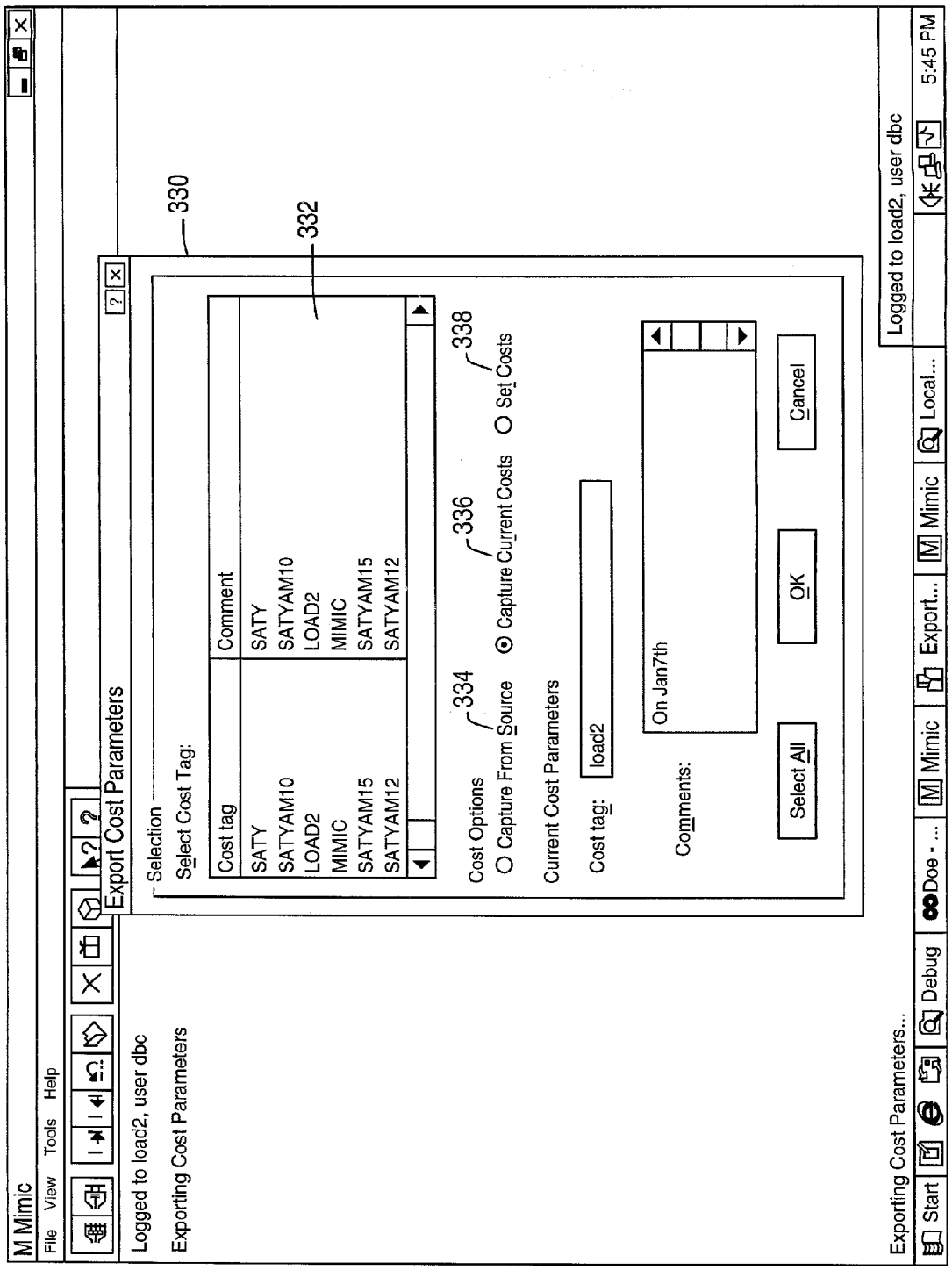

FIG. 10 shows an Export Cost Parameters screen 330 that is displayed in response to activation of a Select Rows button 311 in the Export Options screen (FIG. 8). A selection box 332 lists rows of a cost table that contain cost parameters. Each row contains cost parameters associated with different target database systems. Thus, for example, a customer may have multiple database systems (e.g., one for testing and one for production). The selected row in the selection box 332 selects the cost parameters to export for a desired target database system.

The Export Cost Parameters screen 330 contains a Capture From Source option 334, a Capture Current Costs option 336, and a Set Costs option 338. The Capture From Source option 334 when selected causes cost parameters to be exported directly from the cost table 154 in the target database system. The Capture From AMPs option 336 when selected causes cost parameters to be captured directly from the AMPs in the target database system, rather than from the cost table 154. The Set Samples option 338 when selected causes cost parameters to be set (by the user) in the target database system, which are then exported.

Figure 11:
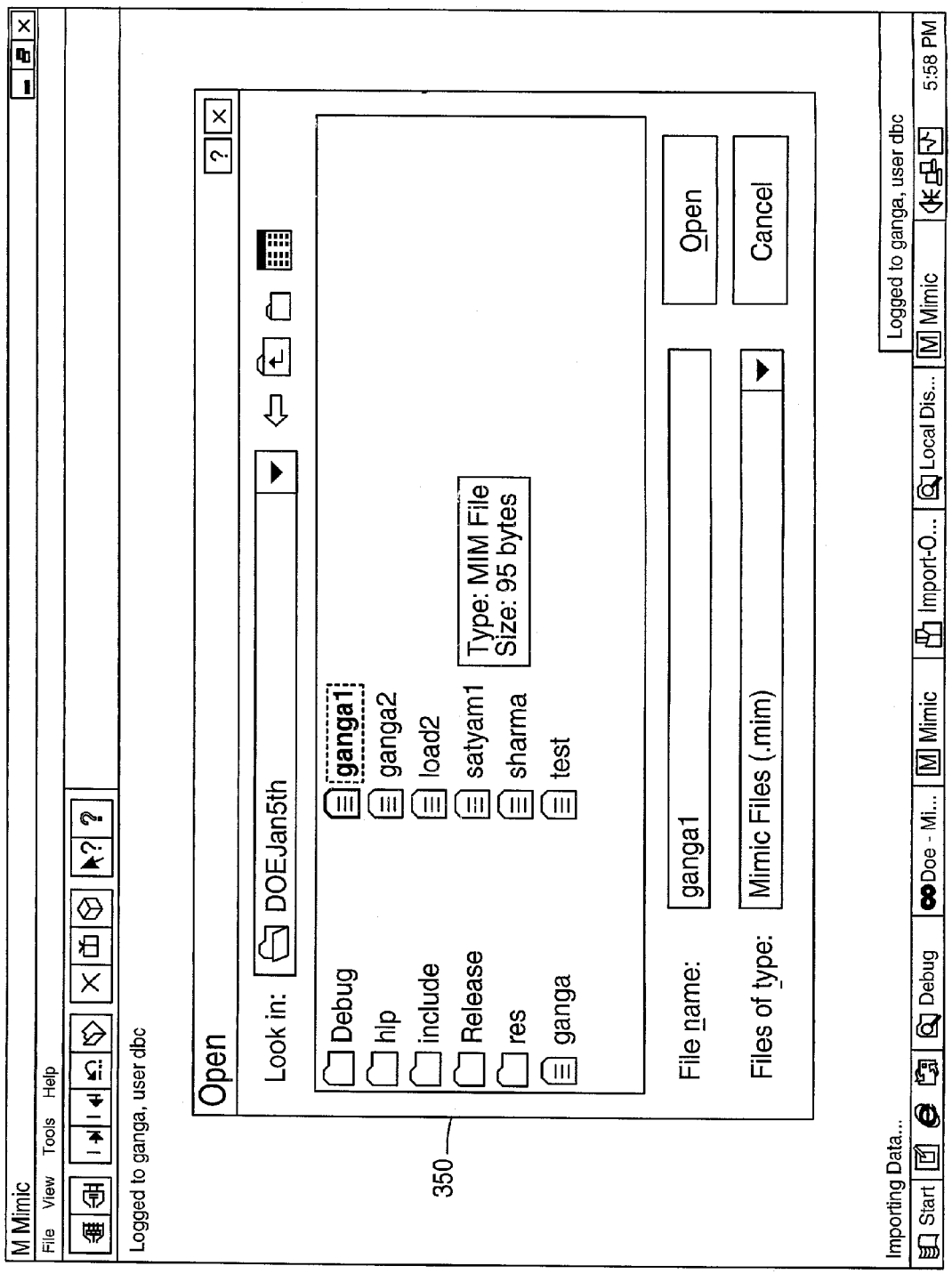
Figure 12:
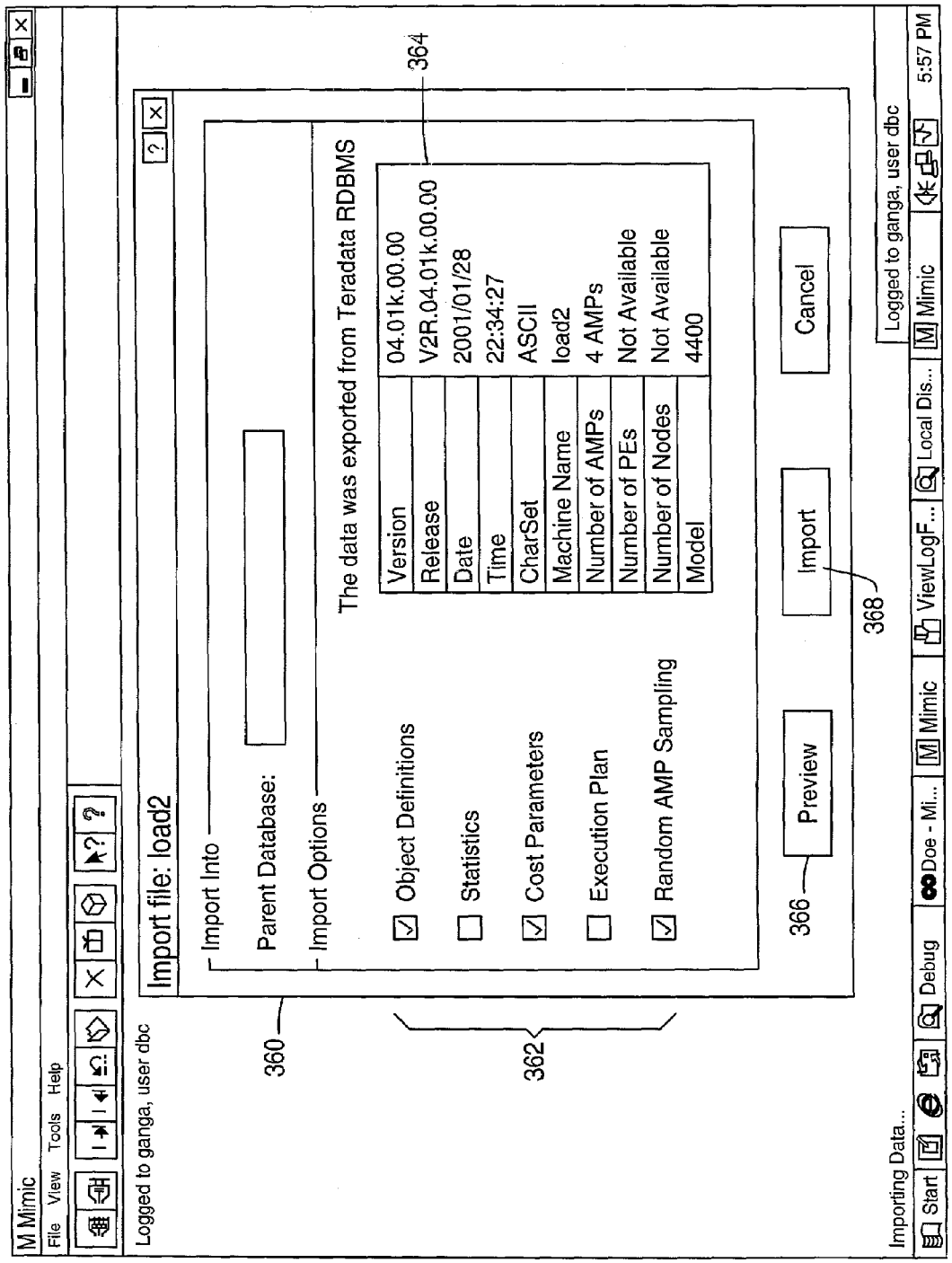

TLE data exported from various target database systems are stored in respective data files 24 in the client emulation system 20. Once exported and saved, the data files 24 can later be opened by selecting a command in the file menu to cause an Open screen 350 (FIG. 11) to be displayed. A list of data files is displayed in the screen 350, with one of the data files selected by a user to open. Once a file is selected for opening, a screen 360 is displayed (as shown in FIG. 12) that shows import options 362 selectable by a user. The types of TLE data to import to the test system 10 are selected using the import options 362. The options 362 are the same options (Object Definitions option, Statistics option, Cost Parameters option, and Random AMP Samples option) that are selectable in the export screens described above. Information pertaining to the source of the TLE data is displayed in a display box 364.

Figure 13:
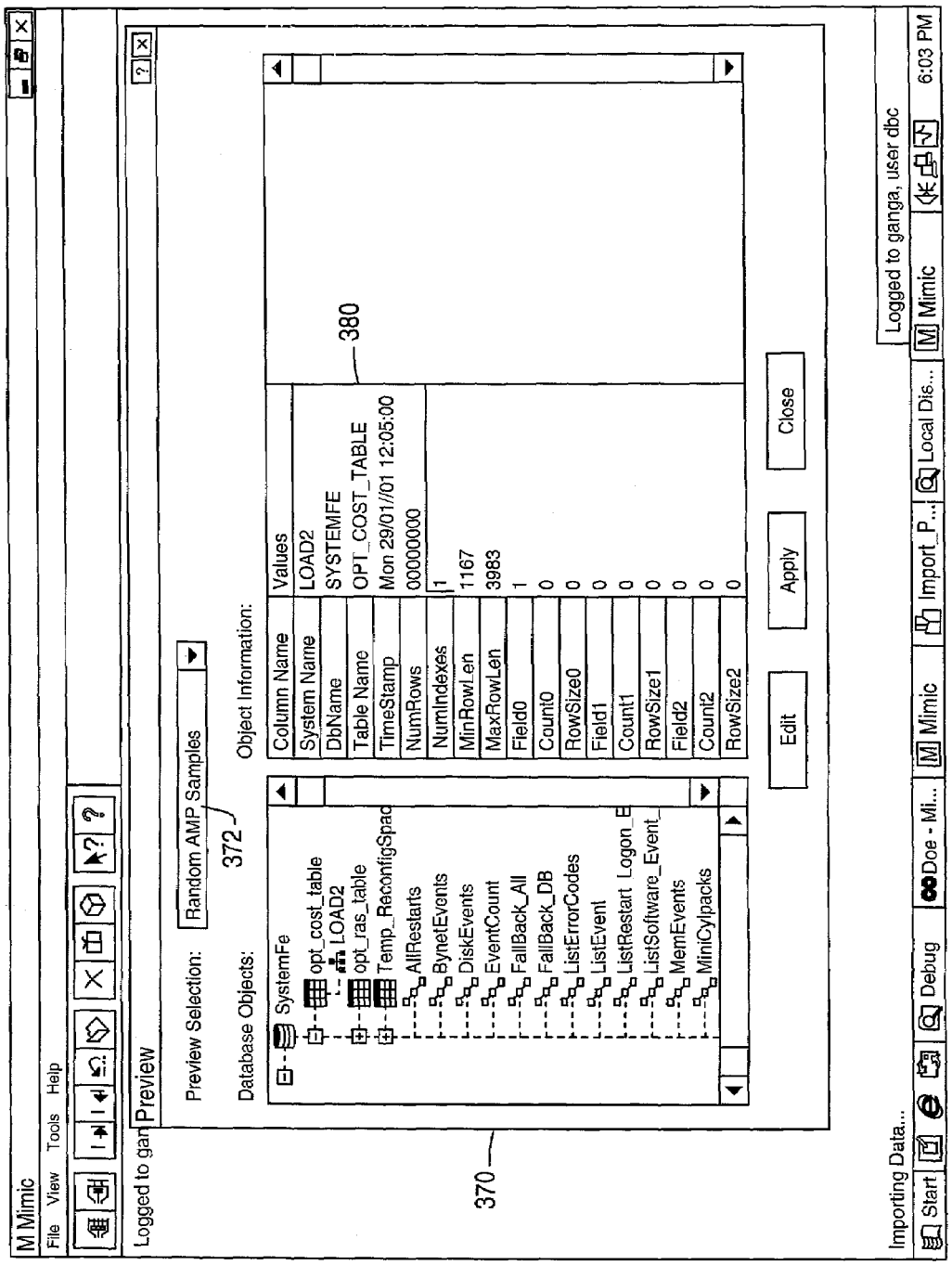

The screen 360 also includes various buttons, including a Preview button 366 and an Import button 368. If the Preview button 366 is selected, then a Preview screen 370 is displayed (FIG. 13) in which the TLE data to be imported to the test system 10 can be previewed by a user. The Preview screen 370 includes a Preview Selection field 372 that enables a user to select the type of information to preview, including object definitions data, statistics data, and random AMP samples data. In the example of FIG. 13, the Random AMP Samples option in the Preview Selection field 372 is selected. The Preview screen 370 displays random AMP samples data for various tables in a database. If an Edit button 374 is activated, the random AMP samples data can be modified by the user.

A mechanism is thus provided to enable accurate test query performance analysis in a test system that is separate from a production database system. Random samples are collected from the production database system, with the random samples collected from a segment of the production database system to enable faster retrieval of the information. Using the random samples along with other information extracted from the production database system, an emulated environment of the production database system is created in the test system in which an optimizer is executed to perform query plan analysis.

Instructions of the various software routines or modules discussed herein (such as the optimizer 18, database management software 16 or 36, system emulation tool 22, visual explain and compare tool 42, and so forth) are stored on one or more storage units in the corresponding systems and loaded for execution on corresponding control units or processors. The control units or processors include microprocessors, microcontrollers, processor modules or subsystems (including one or more microprocessors or microcontrollers), or other control or computing devices. As used here, a "controller" refers to hardware, software, or a combination thereof. A "controller" can refer to a single component or to plural components (whether software or hardware).

Data and instructions (of the various software routines or modules) are stored in respective storage units, which are implemented as one or more machine-readable storage media. The storage media include different forms of memory including semiconductor memory devices such as dynamic or static random access memories (DRAMs or SRAMs), erasable and programmable read-only memories (EPROMs), electrically erasable and programmable read-only memories (EEPROMs) and flash memories; magnetic disks such as fixed, floppy and removable disks; other magnetic media including tape; and optical media such as compact disks (CDs) or digital video disks (DVDs).

The instructions of the software routines or modules are loaded or transported to each system in one of many different ways. For example, code segments including instructions stored on floppy disks, CD or DVD media, a hard disk, or transported through a network interface card, modem, or other interface device are loaded into the system and executed as corresponding software modules or layers. In the loading or transport process, data signals that are embodied in carrier waves (transmitted over telephone lines, network lines, wireless links, cables, and the like) communicate the code segments, including instructions, to the system. Such carrier waves are in the form of electrical, optical, acoustical, electromagnetic, or other types of signals.

While the invention has been disclosed with respect to a limited number of embodiments, those skilled in the art will appreciate numerous modifications and variations there from. It is intended that the appended claims cover such modifications and variations as fall within the true spirit and scope of the invention.

What is claimed is:

1. An article comprising at least one computer-readable storage medium containing instructions that when executed cause a computerized system to:
   import random sample statistics of a target database system into a test system for emulating the target database system, wherein the target database system supports a standard database query language;
   store the random sample statistics in a storage location;
   generate a full set of statistics from the random sample statistics; and
   use the full set of statistics in selecting a query plan in response to a given query;
   wherein the instructions when executed also cause the computerized system to:
   import cost-related information of the target database system; and
   emulate an environment of the target database system based on the random sample statistics and cost-related information of the target database system,
   wherein using the full set of statistics in selecting the query plan is performed in the emulated environment.

2. A computer-implemented method comprising:
   importing random sample statistics of a target database system into a test system for emulating the target database system, wherein the target database system supports a standard database query language;

storing the random sample statistics in a storage location;

generating a full set of statistics from the random sample statistics; and using the full set of statistics in selecting a query plan in response to a given query;

wherein the method also includes:

importing cost-related information of the target database system; and emulating an environment of the target database system based on the random sample statistics and cost-related information of the target database system, wherein using the full set of statistics in selecting the query plan is performed in the emulated environment.

* * * * *